United States Patent [19]

Doyen et al.

[11] Patent Number: 5,416,750
[45] Date of Patent: May 16, 1995

[54] BAYESIAN SEQUENTIAL INDICATOR SIMULATION OF LITHOLOGY FROM SEISMIC DATA

[75] Inventors: Philippe M. Doyen, Thames Ditton; David E. Psaila, Heston, both of England

[73] Assignee: Western Atlas International, Inc.

[21] Appl. No.: 218,668

[22] Filed: Mar. 25, 1994

[51] Int. Cl.$^6$ .......................... G01V 1/40; G01V 1/34; G06K 9/68
[52] U.S. Cl. .......................... 367/73; 367/30; 364/421; 382/168
[58] Field of Search .......................... 367/28, 30, 68, 73; 364/413.13, 421, 422, 570, 578; 382/38, 26, 49, 51

[56] References Cited

U.S. PATENT DOCUMENTS

| | | | |
|---|---|---|---|
| 4,926,394 | 5/1990 | Doyen | 367/73 |
| 4,995,011 | 2/1991 | Spiesberger | 367/127 |
| 5,168,161 | 12/1992 | Markandey | 250/330 |
| 5,257,242 | 10/1993 | Clawson | 364/421 |
| 5,276,632 | 1/1994 | Corwin et al. | 364/578 |
| 5,325,445 | 6/1994 | Herbert | 382/38 |
| 5,347,541 | 9/1994 | Iltis et al. | 375/12 |

OTHER PUBLICATIONS

Farmer, C. L., The Mathematical Generation of Reservoir Geology, IMA/SPE European Conference on the Mathematics of Oil Recovery, Jul., 1989.
Solow, A. R., Mapping by Indicator Kriging, Mathematical Geology, vol. 18, No. 3, 1986, pp. 335–351.
Doyen et al, Annu. AAPG-SEPM-EMD-DPA Conv. (S. F. Jun. 6, 1990), AAPG Bull v 74, #5, p. 645, abst. only herewith.
Doyen et al, 59th Annu. Soc. Explor. Geophys. Int. Mtg. (Dallas, Nov. 2, 1989), vol. 2, pp. 719–722; abst. only provided herewith.
Smith et al, Leading Edge, vol. 11, #1, pp. 22–26, Jan. 1992; abst. only provided herewith.

*Primary Examiner*—Nelson Moskowitz
*Attorney, Agent, or Firm*—William A. Knox

[57] ABSTRACT

A discretized lithologic model of the subsurface is defined by a regular array of pixels. Each pixel corresponds to one of a finite number of possible lithoclasses such as sand, shale or dolomite. The lithoclasses are unknown except at a small number of sparsely distributed control pixels associated with borehole locations. Associated with each pixel there is a multivariate record of seismic attributes that may be statistically correlatable with the local lithology. A Monte Carlo method is used to simulate the lithoclass spatial distribution by combining the lithologic data at control pixels with the seismic-attribute data records. Using Indicator Kriging, a prior probability distribution of the lithoclasses is calculated for each pixel from the lithology values at neighboring pixels. The likelihood of each lithoclass is also calculated in each pixel from the corresponding conditional probability distribution of seismic attributes. A posterior lithoclass probability distribution is obtained at each pixel by multiplying the prior distribution and the likelihood function. The posterior distributions are sampled pixel-by-pixel to generate equally probable models of the subsurface lithology.

6 Claims, 6 Drawing Sheets

SAND

SHALE

SAND

SHALE

SAND    SHALE

FIG. 8a

| 1 | 0 | 0 |
|---|---|---|
| 0 | 1 | 0 |

SAND = 1   SHALE = 0

FIG. 8b

| 1 | 1 | 0 |
|---|---|---|
| 0 | 0 | 1 |

SAND = 1   SHALE = 0

FIG. 8c

| 0 | 1 | 0 |
|---|---|---|
| 1 | 0 | 0 |

SAND = 1   SHALE = 0

FIG. 9

| 1 | 1 | 0 |
|---|---|---|
| 0 | 0 | 0 |

SAND = 1   SHALE = 0

BAYESIAN SEQUENTIAL INDICATOR SIMULATION OF LITHOLOGY FROM SEISMIC DATA

BACKGROUND OF THE INVENTION

1. Field of the Invention

This invention is concerned with a method for generating subsurface models of lithology using a Monte Carlo procedure. The lithologic models are obtained by combining seismic attribute records collected along an array of seismic stations that are deployed over an area of interest and from lithology observations in boreholes located within or close to the area covered by the seismic survey.

2. Discussion of Related Art

Although the art of seismic exploration is well known, those principles that are germane to this invention will be reviewed briefly. An acoustic wavefield is generated at or near the surface of the earth to insonify the underlying earth layers or strata. The wavefield is reflected in turn from each subsurface stratum whence the wavefield returns to the surface. The returning reflected wavefield manifests itself as a periodic mechanical motion of the earth's surface that is detected by suitable sensors. The sensors convert the mechanical motion to electrical signals which are recorded on an archival storage medium such as time-scale recordings in analog or digital format as desired by the investigator.

Of the many quantities that may be gleaned from the recorded seismic data, two are of particular interest, namely: Reflection travel time and reflection amplitude. Reflection travel time is a measure of the depth of the respective strata. Reflection amplitude depends upon the reflectivity coefficient at the interface between two strata. The reflectivity coefficient depends upon the difference in acoustic impedance across the interface. The acoustic impedance of a stratum is defined by the product of the acoustic velocity and the density of that rock layer. Impedance is measured in units of meters per second per gram per cubic centimeter.

To be of use quantitatively, the observed reflection amplitude must be corrected for spherical spreading, instrumental artifacts and other predictable effects to provide true amplitude measurements. The resulting true amplitudes may used to calculate the acoustic impedances of the respective strata.

It can be demonstrated that limited ranges of acoustic impedance values can be associated with particular rock types such as, by way of example but not by way of limitation, sand, shale and dolomite. However, because of seismic and lithologic noise, there is overlap between the ranges of impedance values attributable to each lithoclass. Thus, any one calculation of acoustic impedance is at best only an estimate of a particular lithoclass, the estimate being subject to statistical uncertainty.

In the course of geoexploration, control points may be established by boreholes, often quite widely separated, that penetrate strata of interest. At such sparse control points, the seismic observations may be calibrated by comparison of selected seismic attributes with a study of the texture and composition of the target strata. The desideratum of a seismic survey line, having relatively closely-spaced observation stations that are distributed between the sparse control points, is to estimate the continuity of one or more target lithologic horizons between the control points.

U.S. Pat. No. 4,926,394 issued May 15, 1990 to Phillipe M. Doyen and assigned to the assignee of this invention, teaches a type of Monte Carlo statistical method for estimating a variation in rock type or texture, that is, the change in lithology along a given stratum or a related grouping of strata within a selected geologic formation. The estimates are based on seismic data gathered over an array of survey lines that coincide with sparsely-spaced control points such as boreholes. This is a type of maximum a posteriori estimation technique. It suffers from the disadvantages that a) it is computer intensive; b) it is sometimes difficult to guarantee convergence of the iterative optimization procedure used in the technique; c) it is difficult to specify the required lithology transition statistics.

A number of methods have been suggested that are based on image enhancement techniques such as discussed in the paper *The Mathematical Generation of Reservoir Geology* by C. L. Farmer, presented July, *1989* at the IMA/SPE European Conference on the Mathematics of Oil Recovery.

Another technique involves Indicator Kriging such as is discussed in a paper entitled *Mapping by Simple Indicator Kriging* by Andrew R. Solow in Mathematical Geology, v. 18, no. 3, 1985. That method is a generalized linear regression technique to calculate a lithoclass probability distribution function at one location from lithoclass data at other locations in the pertinent space of interest. The method requires the specification of a spatial correlation model which may be difficult to infer from sparse borehole control. Simple Indicator Kriging does not allow direct integration of seismic information. Also the models are poorly defined if well control is sparse. The term "indicator" implies that the lithoclasses are discrete variables such as sand or shale rather than continuous variables such as permeability.

There is a need for a method that will generate simulated models of subsurface lithology by combining seismic attribute data and lithologic observations in boreholes. The method should be easy to generalize in the presence of multivariate environments.

SUMMARY OF THE INVENTION

An array of seismic stations having a predetermined spacing is emplaced over a region of interest that may include a paucity of control points corresponding to borehole locations. The data collected at the respective seismic stations include seismic attributes that are correlatable with the type and texture of the subsurface rock layers. The respective seismic stations define an array of pixels having dimensions comparable to the preselected station spacing.

The method of this invention includes the steps of randomly selecting a pixel from the array. Using Indicator Kriging, estimates the prior probability distribution of the lithoclasses for the selected pixel, given the lithologic data at the neighboring pixels. Based upon the seismic and lithologic data as observed at the control points, determine the likelihood of occurrence of each lithoclass at the chosen pixel. Determine the lithoclass posterior probability distribution from the product of the prior probability distribution and the likelihood function. Draw a simulated lithoclass value at the selected pixel by randomly sampling from the posterior distribution and consider the simulated value as an additional control point in the simulation process. Repeat the steps of selecting a pixel, calculating the posterior distribution and sampling from the posterior distribution until lithoclass values are simulated for all pixels of the array.

In an aspect of this invention, the likelihood function is derived from the lithoclass-conditional probability distributions of the seismic attributes.

In an aspect of this invention, the selected seismic attribute is acoustic impedance as derived from normalized seismic reflection amplitudes.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIGS. 8A–8C exhibit three simulations of the lithoclass at selected pixels; and

FIG. 9 is the final estimate from among the three estimates of FIGS. 8A–8C.

DETAILED DESCRIPTION OF THE PREFERRED EMBODIMENT

Figure 1:
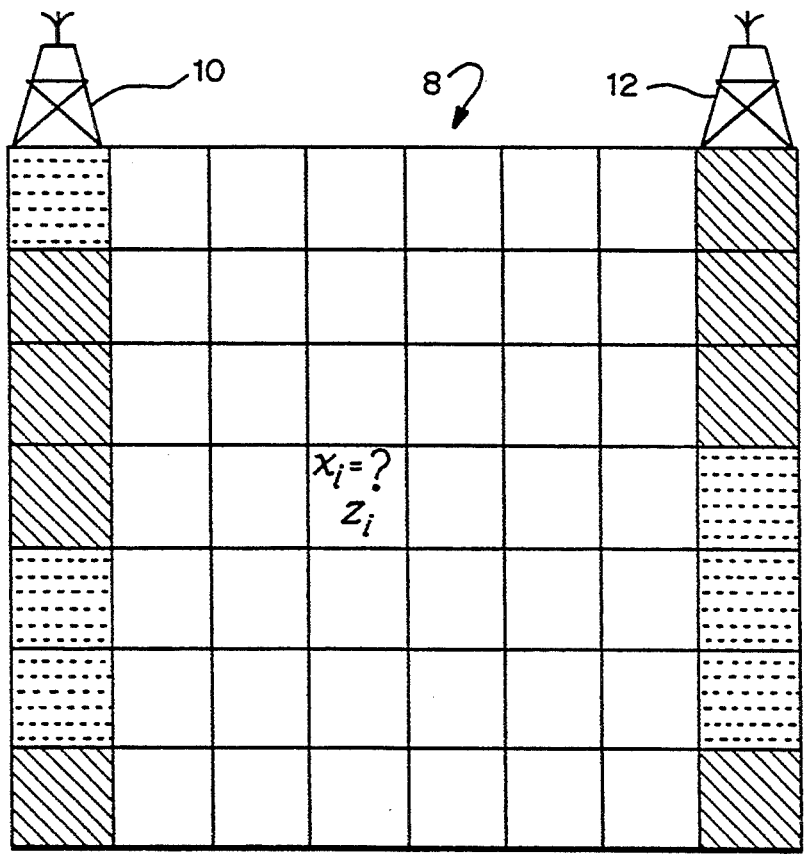
FIG. 1 represents an array of pixels positioned between two borehole control points.

FIG. 1 represents a vertical slice or section 8 of the earth between two boreholes 10 and 12 at opposite ends of the slice. The section has been divided into an array of pixels, i, whose dimensions are arbitrary but preferably are commensurate with the spacing of a plurality of seismic observation stations (not shown) that are distributed between boreholes 10 and 12. Associated with each pixel, there is a lithoclass $x_i$, here assumed to be a discrete binary variable for simplicity but not limited thereto, such as sand and shale. From well logs, the known lithoclasses for each pixel beneath the boreholes 10 and 12 are shown as diagonal shading for sand and horizontal dashed lines for shale. Boreholes 10 and 12 provide control points for correlating some seismic attribute $z_i$, such as trace amplitude or inverted acoustic impedance, with a particular lithoclass $x_i$. The $x_i$ assume values of 1 for sand and 0 for shale. It is desired to simulate a subsurface model of the lithology that is consistent with both the well data and the seismic data. It is obvious that a plurality of similar vertical sections may be assembled over an area to provide three-dimensional coverage for the area of interest.

Figure 2:
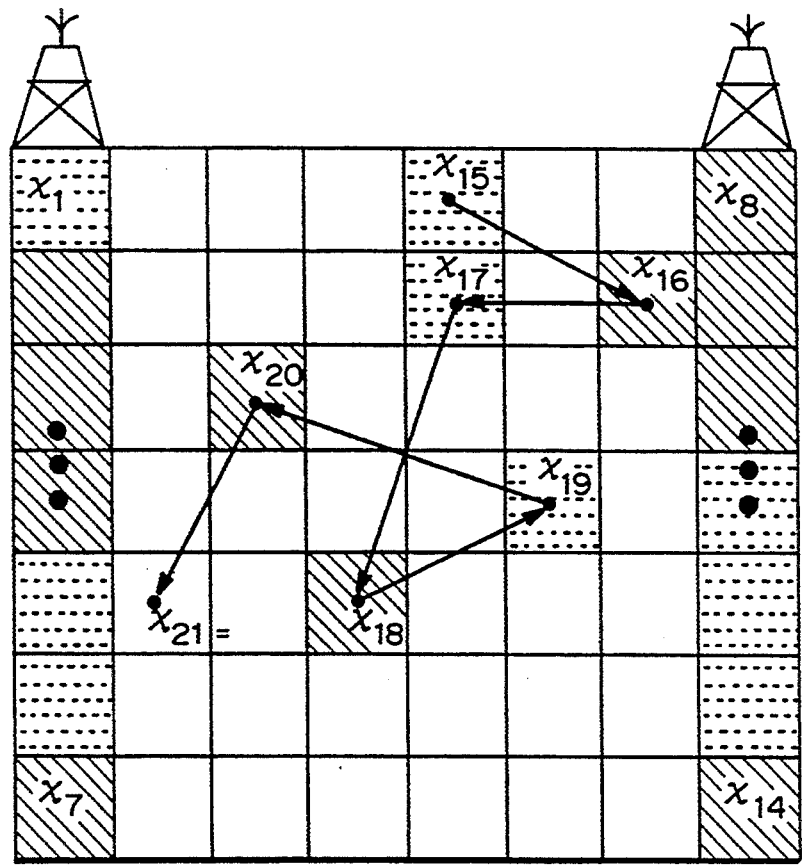
FIG. 2 exhibits a random selection of pixels, $x_i$, for study.

With reference to FIG. 2, we begin by randomly selecting a pixel such as $x_{21}$ that has not yet been simulated. Other pixels that had been previously visited in random order are indicated by the arrows. The local sand/shale distribution is estimated by use of Indicator Kriging according to the formulations $$p^{sand}_{IK}(i) = p(x_i = 1 | x_1, \ldots, x_{i-1}) \quad (1)$$

$$p^{shale}_{IK}(i) = 1 - p^{sand}_{IK}(i) \quad (2)$$

Figure 3:
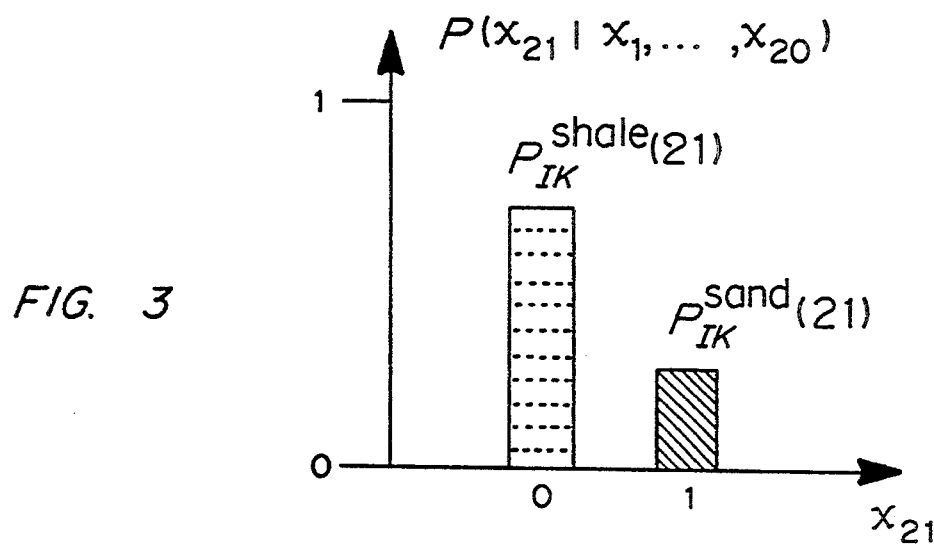
FIG. 3 is the prior sand/shale probability distribution for pixel $x_{21}$.

For the 21st pixel, select $x_{21} \in \{sand/shale\}$ at random from the Kriging-derived sand/shale probability distribution as shown in FIG. 3. The complete simulation process amounts to repeating the calculations and sampling of the sand/shale probability distributions at all pixels of the model, following a random pixel visitation sequence.

Figure 4:
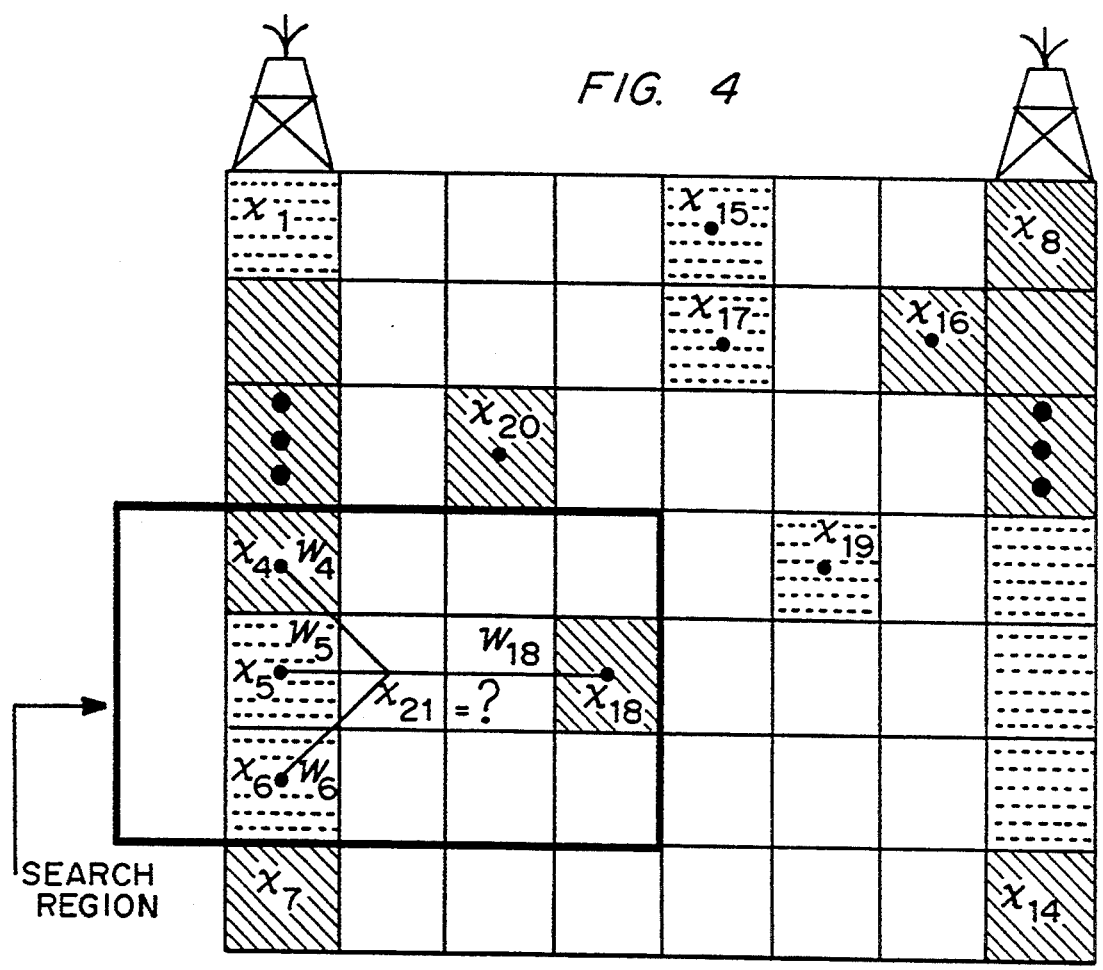
FIG. 4 shows the input data used for Indicator Kriging to determine the prior sand/shale probability distribution.

From a practical viewpoint, the sand/shale probabilities are calculated at each pixel along the random path as linear combinations of the observed data and any previously simulated values lying within a local search area as shown in FIG. 4. Thus, we want to estimate the most likely lithoclass for pixel 21 given knowledge of the nearby lithoclasses in pixels 4, 5, 6 and 18. Remembering the discrete binary values that were assigned for sand and shale respectively, the sand probability may be evaluated from $$p^{sand}_{IK}(21) = (w_4 \cdot 1) + (w_5 \cdot 0) + (w_6 \cdot 0) + (w_{18} \cdot 1) + w_0. \quad (3)$$

The bias constant $w_0$ is determined from $$w_0 = \{1 - \Sigma w_i\} \cdot \pi^{sand} \quad (4)$$

where $\pi^{sand}$ is the proportion of sand in the gross rock volume.

The data weights $w_i$ to be applied to each pixel are determined from the condition that the lithology prediction error is to be minimized in a least mean square sense. The data weights $w_i$ are obtained by solving a system of linear normal equations:

$$\begin{vmatrix} C_{4,4} & C_{4,5} & C_{4,6} & C_{4,18} \\ C_{5,4} & C_{5,5} & C_{5,6} & C_{5,18} \\ C_{6,4} & C_{6,5} & C_{6,6} & C_{6,18} \\ C_{18,4} & C_{18,5} & C_{18,6} & C_{18,18} \end{vmatrix} \begin{vmatrix} w_4 \\ w_5 \\ w_6 \\ w_{18} \end{vmatrix} = \begin{vmatrix} C_{21,4} \\ C_{21,5} \\ C_{21,6} \\ C_{21,18} \end{vmatrix} \quad (5)$$

where $C_{ij}$ denotes the spatial covariance evaluated for the inter-distance vector between pixels i and j. Solution of this Indicator Kriging system requires the specification of a spatial covariance model characterizing the spatial continuity of the lithologic variations. An example of a spatial covariance model is $$C(h_x, h_y) \propto \exp\{(-rh_x/\xi_x) + (-rh_y/\xi_y)\}, \quad (6)$$

where $(h_x, h_y)$ define an inter-distance vector between two pixels and $\xi_x$ and $\xi_y$ are the correlation ranges along the horizontal x and vertical y directions to accommodate anisotropy along the respective coordinates and r is a normalizing constant. In the three-dimensional case, an additional correlation range $\xi_z$ and a third component $h_z$ must be introduced.

The sequential indicator simulation process just described accounts for spatial continuity in the lithologic variations and honors the well data but it does not incorporate available seismic data and the model is poorly defined in the presence of sparse data resulting from a paucity of well information. We must therefore introduce additional steps as follows.

Figure 5:
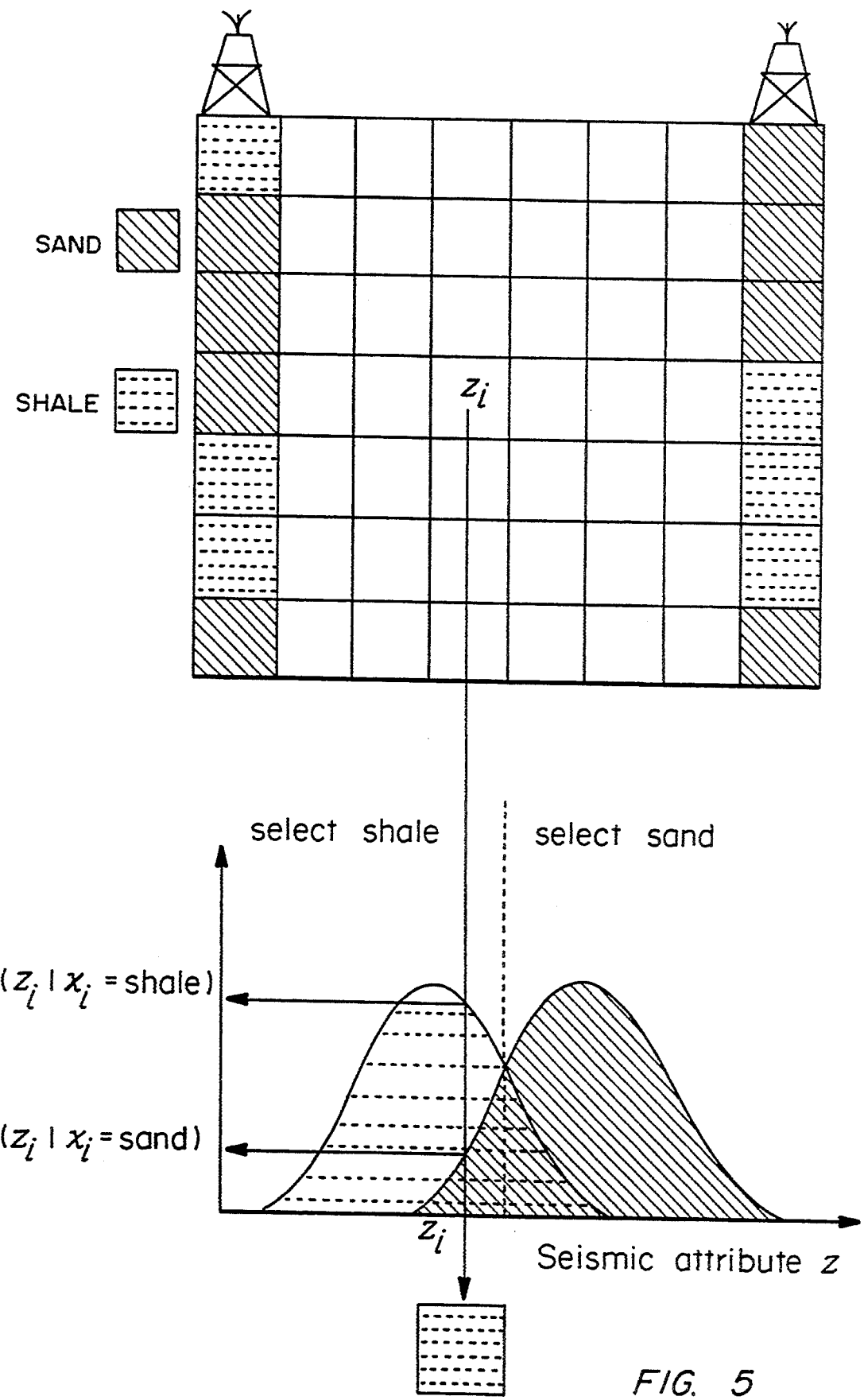
FIG. 5 shows the conditional probability distribution of the seismic attribute z for two lithoclasses.

From seismic attributes and corresponding lithoclass observations in wells, we can construct a conditional probability distribution of the seismic attributes for each lithoclass. FIG. 5 shows the lithoclass-conditional distributions in the case of a single seismic attribute z, representing for example, seismic amplitude or impedance. The overlap between the conditional distribution of z for sand and shale reflects the uncertainty in seismic discrimination of lithology.

At each pixel i, we calculate the likelihood of each lithoclass from the corresponding lithoclass-conditional distribution. In the example in FIG. 5, the likelihood of shale in pixel i, $f(z_i|x_i=0)$ is greater than the likelihood of sand $f(z_i|x_i=1)$. The prior sand/shale probability distribution as determined from Indicator Kriging at pixel i, is multiplied by the corresponding likelihood function to define the posterior lithoclass probability distribution $p(x_i|z_i, x_1, \ldots, x_n)$:

$$p^{sand}(i) \propto p^{sand}_{IK}(i) * f(z_i|x_i=1),$$

$$p^{shale}(i) - p^{shale}_{IK}(i) * f(z_i|x_i=0).$$

Figure 6:
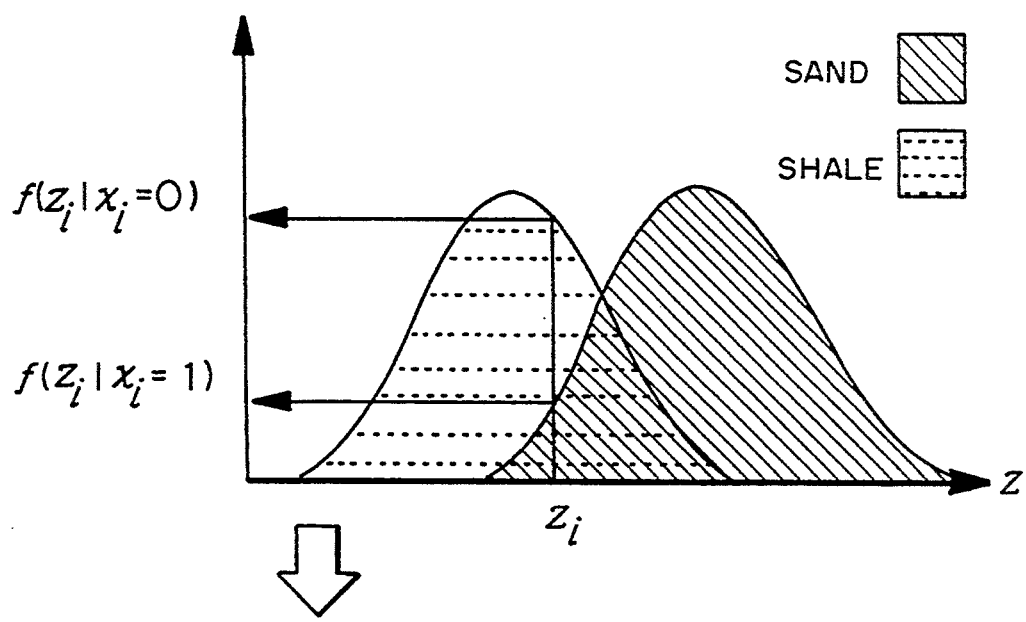
FIG. 6 illustrates the combination of the likelihood function and the prior distribution to yield the posterior distribution.
Figure 6:
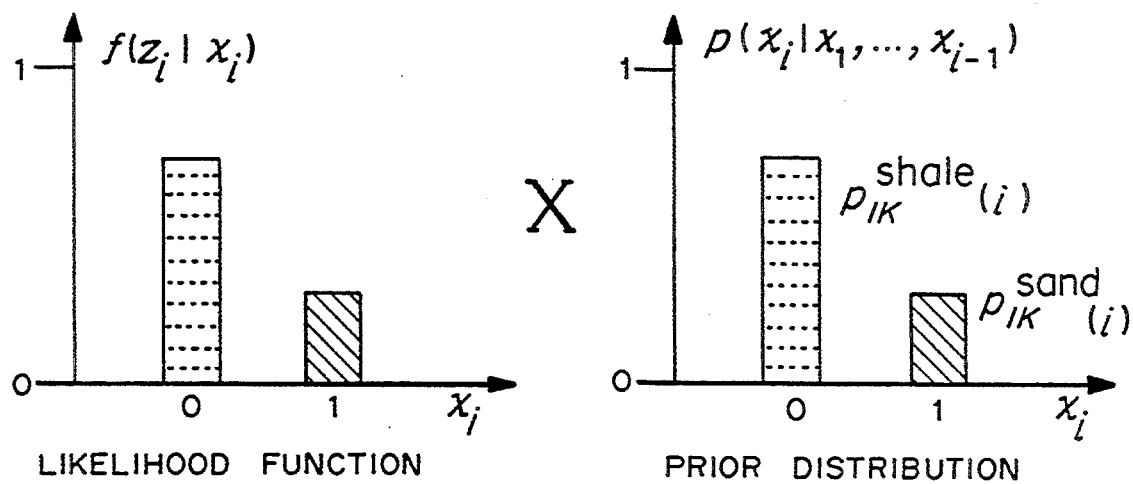
Figure 6:
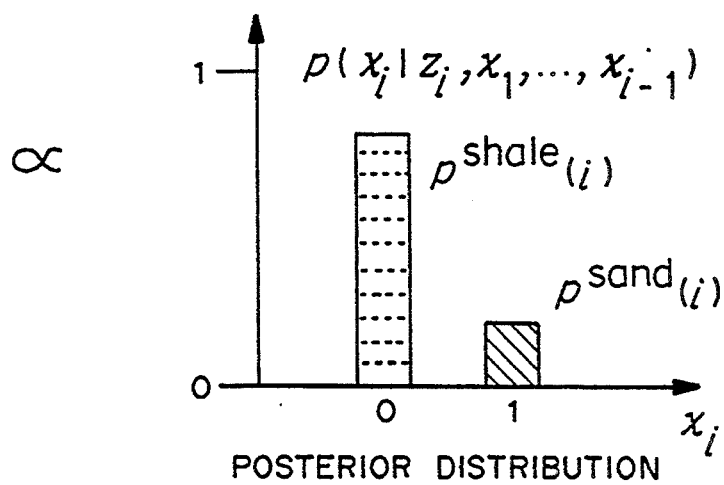

The process is illustrated in FIG. 6.

Figure 7:
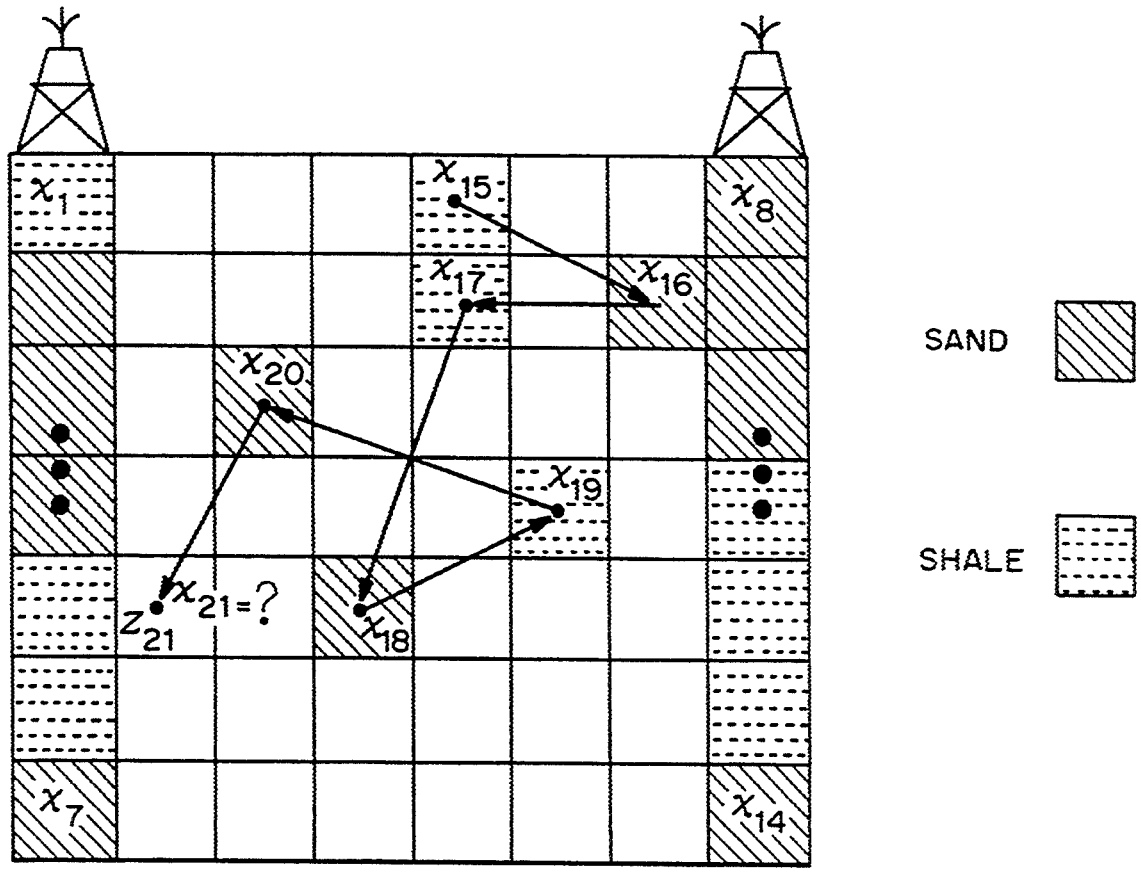
FIG. 7 shows the results of applying the operation of FIG. 6 to pixel $x_{21}$ of FIG. 4.
Figure 7:
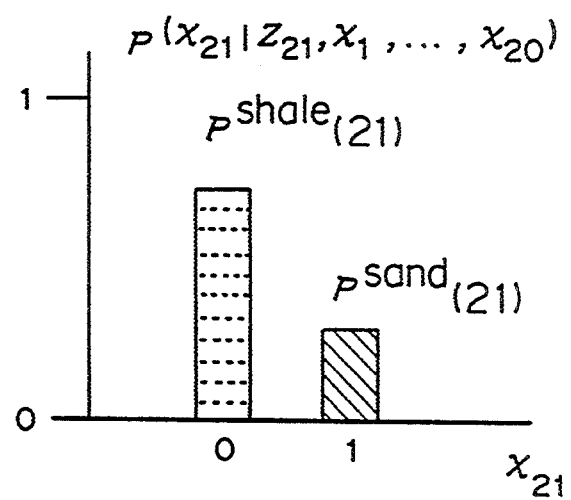

FIG. 7 illustrates the simulation process incorporating seismic data. A pixel, such as $x_{21}$ is selected at random from among the pixels not yet simulated. The lithoclass posterior distribution is determined at the selected pixel by combining, preferably by multiplying as previously stated, the prior distribution and the likelihood function as explained above. The simulated lithoclass value is then obtained by sampling at random from this posterior distribution. The newly simulated pixel is treated as an additional control point when simulating subsequent pixels. The steps of selecting a pixel at random, constructing and sampling from the posterior distribution are applied repeatedly until all of the pixels of the array have been visited and simulated.

As with any Monte Carlo procedure, the resulting lithologic model is not unique. More than one possible answer will emerge depending upon the order of the pixel visitation sequence and the random sampling of the posterior distribution in each pixel. In practical application therefore, it is preferable to iteratively create a number, say n, of equally probable lithologic models. The final most probable model is obtained by assigning to each pixel, the lithoclass having the majority count from among the n simulated lithoclass models. FIGS. 8A–8C include groups of six pixels selected from an array of pixels showing three different simulations of the lithology at the same six pixels. FIG. 9 exhibits the final estimate of the lithology.

The best method of operation is best shown by a numerical example. It is given that $$\pi^{sand} = \pi^{shale} = 0.5,$$

$$r=3,$$

$$\xi_x=20,$$

$$\xi_y=10.$$

Then inserting quantities into equations 5 and 6, we have,

| 1.0 | 0.7408 | 0.5488 | 0.4724 | $w_4$ | | 0.6376 |
|---|---|---|---|---|---|---|
| 0.7408 | 1.0 | 0.7408 | 0.6376 | $w_5$ | | 0.8607 |
| | | | | | = | |
| 0.5488 | 0.7408 | 1.0 | 0.4724 | $w_6$ | | 0.6376 |
| 0.4724 | 0.6376 | 0.4724 | 1.0 | $w_{18}$ | | 0.7408 |

Solving for the weights $w_i$, we have $$w_4=-0.0, w_5=0.654, w_6=-0.0, w_{18}=0.324$$

and $w_0=0.011$ is determined from (4). Substituting the values for the $w_i$ and $w_0$ in (3), we have $$p_{21}^{sand}=0.335; p_{21}^{shale}=0.665.$$

Assuming that the maximum likelihood function is given by $$\begin{cases} f(z_{21}|x_{21}=0) = 0.7, \\ f(z_{21}|x_{21}=1) = 0.3, \end{cases}$$

then $$\begin{cases} p^{shale}(x_{21}|z_{21}, x_1, \ldots, x_{20}) \propto 0.466, \\ p^{sand}(x_{21}|z_{21}, x_1, \ldots, x_{20}) \propto 0.100. \end{cases}$$

Therefore, the simulated lithoclass for pixel 21 is most likely to be shale.

This method has been described with a certain degree of specificity; the description is exemplary only. Those skilled in the art will doubtless arrive at modifications of this process but which will fall within the scope and spirit of this invention which is limited only by the appended claims.

What is claimed is:

1. A method for generating simulated models of discrete lithoclass values on a regular array of pixels by combining known lithologic data at a number of distributed control pixels corresponding to well locations, with seismic attributes gathered from stations associated with said pixels, comprising:
   (a) measuring petraphysical properties of a plurality of earth layers;
   (b) calculating the conditional probability distribution of the seismic attributes for each lithoclass;
   (c) randomly selecting an as-yet unsimulated pixel;
   (d) estimating a prior probability distribution function of the lithoclasses at the selected pixel by combining lithologic data at nearby control pixels;
   (e) calculating a likelihood function of the lithoclasses in said selected pixel from said lithoclass-conditional distribution of seismic attributes;
   (f) calculating a posterior probability distribution function for the lithoclasses in said selected pixel by combining said prior distribution function with said likelihood function;
   (g) drawing a simulated lithoclass value in said selected pixel by sampling at random from said posterior probability distribution function;
   (h) entering said simulated lithoclass value into said array as an additional control pixel;
   (i) repeating steps (b) through (g) until lithoclass values are simulated for all pixels of said array;

(j) generating a lithological model of the earth's subsurface.

2. The method as defined by claim 1, comprising:
repeating steps (b) through (h) n times to generate n equally probable simulated lithology models consistent with said seismic attributes and with said known lithology at said control pixels.

3. The method as defined by claim 2, comprising:
empirically estimating the most probable lithoclass for each pixel as being that lithoclass that exhibits the majority of occurrences among the n simulated lithologic models.

4. The method as defined by claim 3, wherein:
the step of estimating the lithoclass prior probability distribution includes the steps of specifying a spatial covariance model for each lithoclass to characterize the spatial continuity of the lithologic variations and specifying the proportion of each lithoclass in the array of pixels.

5. The method as defined by claim 4, wherein:
the lithoclass-conditional distributions of seismic attributes are estimated for each lithoclass by modeling experimental histograms of seismic attributes at said control pixels or from pseudo-control points obtained by seismic modeling.

6. The method as defined by claim 5, wherein said lithoclass model is three-dimensional.

* * * * *

UNITED STATES PATENT AND TRADEMARK OFFICE
CERTIFICATE OF CORRECTION

PATENT NO. : 5,416,750
DATED : May 16, 1995
INVENTOR(S) : Philippe M. Doyen and David E. Psaila It is certified that error appears in the above-indentified patent and that said Letters Patent is hereby corrected as shown below:

Column 5, line 20, "$x_\ell$" should be --$x_1$--;

line 24, "-" should be -- $\propto$ --.

Column 6, lines 2-8, the equation should be $$\begin{vmatrix} 1.0 & 0.7408 & 0.5488 & 0.4724 \\ 0.7408 & 1.0 & 0.7408 & 0.6376 \\ 0.5488 & 0.7408 & 1.0 & 0.4724 \\ 0.4724 & 0.6376 & 0.4724 & 1.0 \end{vmatrix} \begin{vmatrix} w_4 \\ w_5 \\ w_6 \\ w_{18} \end{vmatrix} = \begin{vmatrix} 0.6376 \\ 0.8607 \\ 0.6376 \\ 0.7408 \end{vmatrix}.$$

Column 7, line 4, "through (h)" should be --through (j)--.

Signed and Sealed this

Twenty-sixth Day of September, 1995

Attest:

BRUCE LEHMAN

*Attesting Officer*   Commissioner of Patents and Trademarks